Dec. 13, 1955     L. W. AUBRY     2,726,762
SEED SEPARATING METHOD AND APPARATUS
Filed Oct. 25, 1952
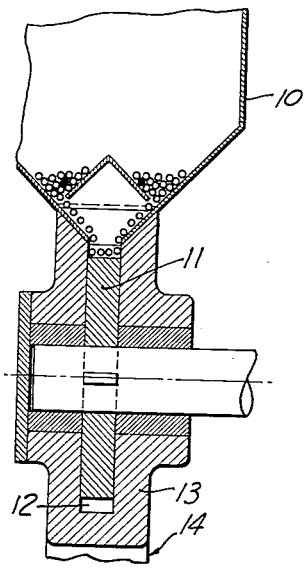
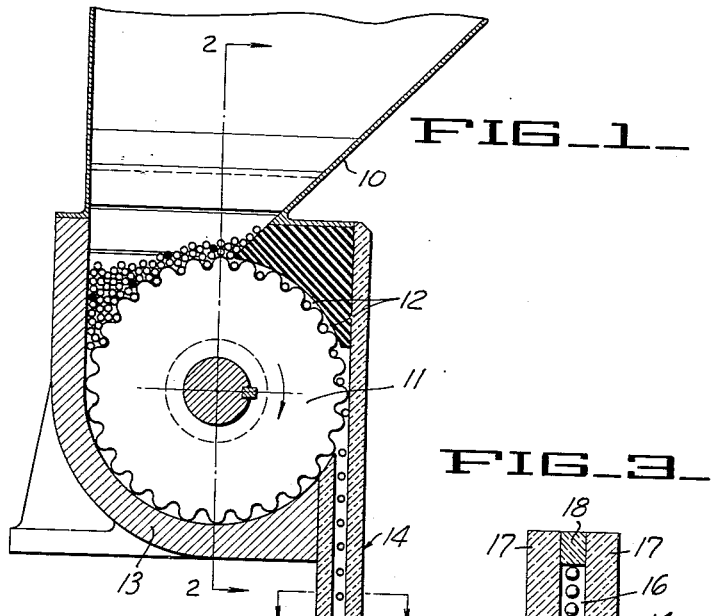
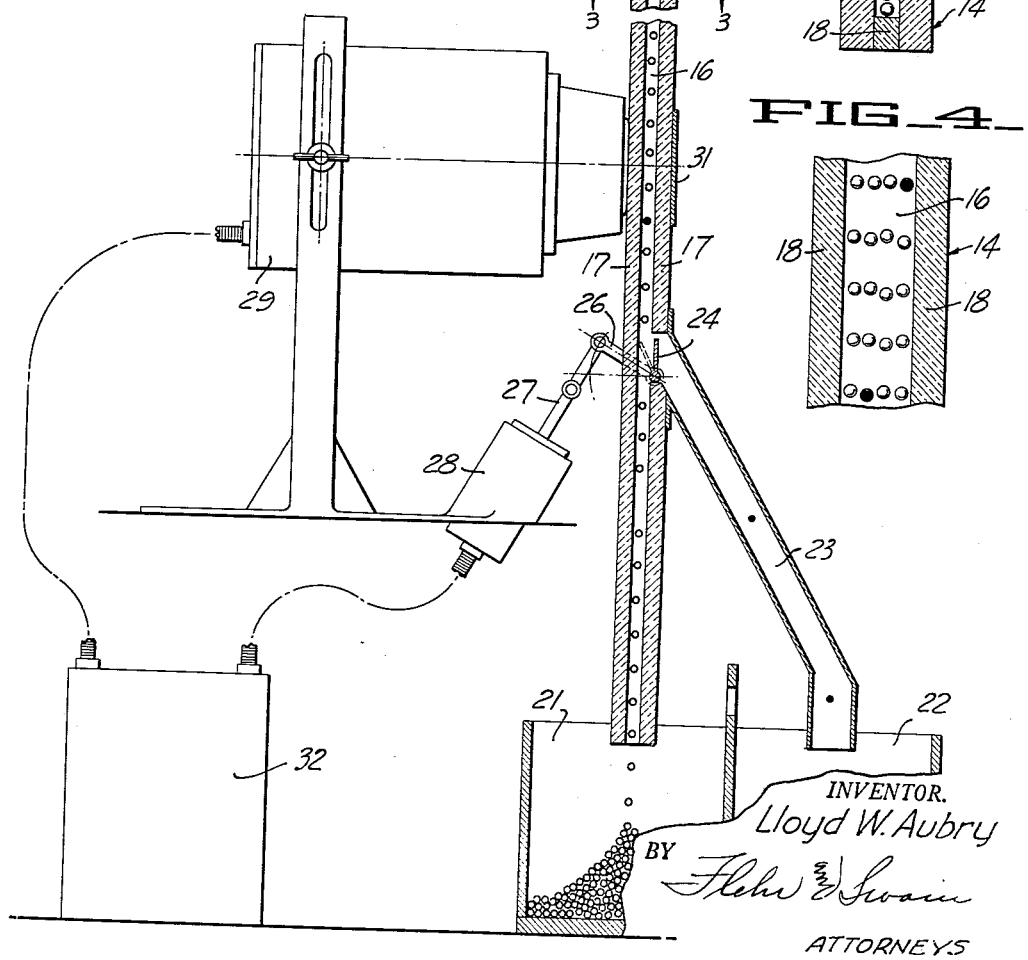
INVENTOR.
Lloyd W. Aubry
BY
ATTORNEYS United States Patent Office 2,726,762
Patented Dec. 13, 1955

2,726,762

SEED SEPARATING METHOD AND APPARATUS

Lloyd W. Aubry, San Mateo, Calif., assignor of one-half to Advance Seed Company, Phoenix, Ariz., a corporation of Arizona Application October 25, 1952, Serial No. 316,869

8 Claims. (Cl. 209—111)

This invention relates generally to methods and apparatus for separating seeds, and for example can be used where it is desired to remove undesired seeds from a seed batch, and the undesired seeds comprise a small percentage of the total quantity.

In the past it has been proposed to use photoelectric means for the separation of seeds in accordance with their color characteristics. The method involves causing the seeds to pass one by one (i. e. single file) through a zone where they are viewed photoelectrically, after which they are selectively delivered into one receiver or another, in accordance with their color characteristics. Such machines are handicapped because of their relatively small capacity, due to the necessity of causing the seeds to pass one by one, through the operating zone of the photoelectric unit.

In general, it is an object of the present invention to provide a seed separating apparatus and method which is capable of relatively high capacity compared to apparatus and methods such as have been used in the past.

Another object of the invention is to provide an apparatus and method of the above character which can be used by commercial establishments and large seed consumers, for the selective removal of undesired seeds.

Another object of the invention is to provide apparatus of the above character which is relatively simple in construction and operation.

Further objects and features of the invention will appear from the following description in which the preferred embodiment of the invention has been set forth in detail in conjunction with the accompanying drawing.

Referring to the drawing:

Figure 1 is a side elevational view schematically illustrating a machine incorporating the present invention.

Figure 2 is a cross-sectional detail taken along the line 2—2 of Figure 1.

Figure 3 is an enlarged cross-sectional detail taken along the line 3—3 of Figure 1.

Figure 4 illustrates the manner in which the seeds are caused to fall downwardly in horizontal rows, which are displaced vertically.

The apparatus illustrated in the drawing consists of a suitable hopper or container 10 which is adapted to receive a batch of seeds to be separated. Seed feeding means 11 is associated with the hopper, and preferably is in the form of a rotary feed wheel having its periphery interrupted by the circumferentially spaced grooves or recesses 12. A housing 13 serves to enclose the wheel, and is constructed whereby a substantial arcuate portion of the wheel is exposed to the mass of seeds within the hopper 10. Rotation of the wheel is clockwise as viewed in Figure 1, and the arrangement is such that each groove 12 receives a plurality of seeds distributed as a horizontal row. The grooves or recesses are proportioned in accordance with the size of the seeds being handled, whereby the seeds in each row are distributed side by side (i. e. single file). The number of seeds in each row may vary, but in various typical instances may be from 4 to 8.

Extending downwardly from the housing 13 there is a device 14 which is adapted to form an unobstructed vertical passage or enclosed space 16. Device 14 can be formed of side plates 17, formed of suitable material such as plate glass, and separated by the side spacers 18, which can likewise be made of glass. The passage 16 in section (see Figure 3) has a width ample to accommodate the rows of seeds, and a length which is slightly greater than the distance occupied by the rows of seeds. The upper end of the passage 16 is disposed to receive seeds dropping from the grooves 12, as the wheel 11 rotates. The passage 16 is disposed vertically, whereby the seeds drop in free flight through the same, without any substantial contact with the adjacent glass surfaces.

A pair of seed receiving compartments or bins 21 and 22 are disposed near the lower end of the device 14. The lower end of passage 16 discharges into the bin 21. Bin 22 receives seeds from the conduit or chute 23. The upper end of this chute communicates with passage 16 through one side wall 17, and seeds are either dropped into the bin 21, or caused to be deflected into the chute 23, by positioning the pivoted deflector plate 24. The pivot pin serving to mount this plate is shown connected to arm 26, which in turn connects to the operating member 27 of the solenoid operator 28. Spring means (not shown) serves to urge the deflector plate toward the position shown in the solid lines in Figure 1.

A photoelectric unit 29 is located a predetermined distance above the deflector 24. This unit can consist of a source of light and a lens system for directing a flat horizontal beam through the adjacent glass wall 17, and upon the downwardly falling seeds. It also includes a photoelectric tube, and optical means for focusing light reflected back from the seeds, whereby such light is directed upon the tube. In addition, it includes one or more color discriminating filters, serving to accentuate the response obtained from seeds of different color characteristics.

In conjunction with the photoelectric unit 29 I provide a member 31 forming a background area. This member can provide a surface having such color characteristics that it matches the color reflecting characteristics of the bulk of the seeds being handled by the apparatus.

Suitable electrical circuiting serves to operatively connect the photoelectric unit and the solenoid whereby a light response serves to momentarily energize the solenoid. This circuiting is schematically represented by unit 32, which may include power supply and amplifying means.

Operation of the apparatus described above, and the method of my invention, may be outlined as follows: It will be assumed that one desires to separate Johnson grass and Dodder seeds from alfalfa seeds. A batch of the alfalfa seeds is placed in the hopper 10. In a typical instance from 1 to 2% of the seeds will be the undesired Johnson grass or Dodder seeds. The Johnson grass and Dodder seeds are decidedly darker in color than the alfalfa seeds. The photoelectric unit 29 and the electrical circuit connections to the same and to the solenoid 28, are made active and the feed wheel 11 is placed in operation to rotate at a constant speed. As the wheel rotates separate rows of seeds are deposited within the grooves or recesses 12, and are carried around and finally dropped successively into the passage 16. As the rows of seeds are first dropped, they assume a given vertical spacing, depending upon the circumferential spacing between the grooves 12 and the speed of rotation of the wheel. However, as the seeds drop downwardly, the spacing automatically increases, due to the acceleration of gravity. The retarding effect of air upon each of the seeds is substantially equal so that the seeds retain their position in horizontal rows. In a typical instance, with alfalfa seeds the rows may be spaced about 5/16 inch apart after they have fallen a distance of about 10 inches. As the spaced rows of seeds pass through the flat light beam of the photoelectric unit 29, they are momentarily viewed by the photoelectric unit, and thereafter they continue downwardly to be deposited in either the bin 21 or 22. The vertical dimensioning of the beam is small compared to the spacing between the rows of seeds, as for example 1/16 inch for a seed spacing of about 5/16 inch. Assuming that the light reflecting characteristics provided by member 31 are substantially the same as the light reflecting characteristics of the desired alfalfa seeds, a row of seed which does not contain one or more of the undesired darker seeds, will not cause any response and therefore will not cause the solenoid to be energized. Therefore, all such rows pass downwardly into the bin 21. However, when a row of seeds passes through the light beam which contains one or more darker seeds, there is an immediate response from the photoelectric unit, and after a predetermined time delay following such response, the solenoid 28 operates the deflector plate 24 whereby that particular row of seeds which was responsible for the light response is deflected into the chute 23. Deflector plate 24 immediately returns to its position, shown in solid lines in Figure 1, so that subsequent rows may pass on to the bin 21.

It will be evident from the foregoing that the device is critical with respect to operation of the deflector 24, in response to the photoelectric unit 29. The critical time delay required for proper operation can be secured by the inherent electrical and mechanical time delay involved in the operation of apparatus of this character. For apparatus having a particular inherent time delay, the apparatus can be adjusted for proper operation by adjusting the photoelectric unit 29 in a vertical direction.

It will be evident from the foregoing that in the operation of my apparatus, considerable numbers of good alfalfa seeds are delivered to the bin 22, together with the undesired darker seeds. In a typical instance where the original batch of seeds contained from 1 to 2% of the undesired darker seeds, 8% of the total batch may be delivered to the bin 22. The percentage with respect to the total batch therefore remains small, and the characteristic just mentioned does not detract from utility. If desired, the percentage of rejected seeds can be reduced by reprocessing the seeds delivered to the bin 22.

It will be evident from the foregoing that my machine and method provide relatively high capacity in separating out undesired seeds. It is applicable to a variety of seeds having such physical shape and form as to be susceptible to dropping in rows, in the manner described above. In general, small round seeds can be handled without difficulty. In addition to alfalfa seeds, particular mention can be made of clover seeds, where it is desired to remove darker weed seeds.

In most instances, the bulk of the seeds will be light in color, and the undesired seeds darker. In some instances, however, the desired seeds may be dark in color, and the undesired seeds lighter in color. In such event the apparatus is adjusted to respond accordingly, by suitable changes in the color filter of the photoelectric unit, and in the color characteristics of the background member 31.

I claim:
1. In apparatus for separating seeds, hopper means for retaining the charge of seeds, seed feeding means for successively delivering spaced horizontally disposed rows of seeds from said hopper means, said feed means serving to drop the rows of seeds successively, whereby the horizontal rows are spaced vertically by an amount which progressively increases as the seeds fall downwardly, a photoelectric unit disposed a substantial distance below said seed feeding means, said photoelectric unit being responsive to the color characteristics of seeds in each row, as each row of seeds falls downwardly past the same, means responsive to said photoelectric unit for selectively diverting the rows of seeds after the seeds have passed said photoelectric means, and means for separately collecting the seeds.

2. Apparatus as in claim 1 in which said seed feeding means comprises a rotatable feed wheel having a plurality of circumferentially spaced grooves in its periphery, said grooves serving to feed spaced horizontal rows of seeds.

3. In a method for separating seeds, causing the seeds to fall successively in substantially free flight in horizontal vertically spaced rows whereby the vertical spacing between the horizontal rows increases progressively during the fall, detecting the presence of one or more seeds in each horizontal row which differ in color from the bulk of the seeds, said last step being carried out in mid-air as the rows of seeds are falling successively past a fixed detecting level, and then causing the falling rows of seed to be delivered to either one of two collecting regions in accordance with the presence or absence of one or more seeds of different color in each of the horizontal rows.

4. In a method for separating seeds, causing seeds to be segregated into spaced horizontal rows from a bulk mass of seeds, causing the segregated rows of seeds to be vertically spaced as they are dropped successively whereby each row falls downwardly in substantially free flight and the vertical spacing between the rows increases progressively during the fall, causing the vertically spaced horizontal rows to fall successively past a detecting level, detecting the presence of one or more seeds in each row which differ in color from the main bulk of the seeds, said last step being carried out at said detecting level, and causing the falling rows of seeds to be delivered to either one of two separate collecting regions in accordance with the presence or absence of one or more of said seeds of different color in each of the horizontal rows.

5. In an apparatus for the separation of seeds means for receiving a charge of seeds, means for feeding the seeds from said first named means into separate, spaced horizontal rows and for dropping the rows successively to thereby vertically space the rows, the vertical spacing between the horizontal rows progressively increasing during the fall, photoelectric means disposed below said feeding means, said photoelectric means being disposed whereby the falling horizontal rows of seeds are viewed in mid-air as they pass in substantially free flight in proximity to the same, and means operated responsive to said photoelectric means for selectively diverting the seeds after they fall past the photoelectric means.

6. In a method for separating undesired seeds from a bulk mass of seeds, segregating the seeds into individual horizontal spaced rows of seeds whereby the seeds in each row are distributed side by side, causing the segregated rows of seeds to be dropped successively whereby horizontal rows of seeds are spaced vertically by an amount which increases progressively as the rows of seeds fall downwardly in substantially free flight, causing the horizontal rows of seeds to fall successively past a detecting level, detecting, while the seeds are in mid-air, the presence of one or more seeds having different light reflecting characteristics from the main bulk of seeds, said last step being carried out at said detecting level, and causing the falling rows of seeds to be delivered to either one of two separate collecting regions in accordance with the presence or absence of one or more of said seeds of different light reflecting characteristics in each of the horizontal rows.

7. In an apparatus for separating seeds, a housing adapted to retain seeds, a rotary feed wheel journalled in said housing, said wheel having a plurality of circumferentially spaced horizontal grooves interrupting its periphery, a hopper on said housing for receiving and retaining a charge of seeds, said housing being constructed whereby a substantial arcuate portion of said wheel is exposed to the mass of seeds in said hopper, each of said grooves in said wheel being dimensioned to receive a single row of seeds whereby the seeds in each row are distributed side by side, a chute extending downwardly from said housing, means for rotating said wheel whereby horizontal rows of seeds are dropped successively into said chute whereby the rows are spaced vertically by an amount which increases progressively as the rows of seeds fall downwardly, said chute being of a width and depth to form substantially an unobstructed vertical passage for the horizontal rows of falling seeds whereby the rows of seeds remain as vertically spaced horizontal rows as they fall through said chute, a photoelectric unit disposed a substantial distance below said feed means alongside said chute, said chute permitting the seeds to be viewed in mid-air as they fall through the chute, said photoelectric cell viewing entire rows of seeds, means on the side of said chute opposite said photoelectric unit for forming a background area, said background area having light reflecting characteristics corresponding to the light reflecting characteristics of the seeds desired to be retained, said photoelectric unit being responsive to the light reflecting characteristics of the seeds in each horizontal row whereby variations in light reflecting properties of the seeds in each horizontal row will be detected, means responsive to said photoelectric unit whereby when a seed or seeds having light reflecting properties varying from the light reflecting characteristics of the background area passes the photoelectric unit, the row of seeds containing this seed or seeds with different light reflecting characteristics will be selectively diverted from the other rows of seeds, and means for separately collecting the seeds.

8. An apparatus for separating seeds as in claim 7 wherein the means for selectively diverting the seeds includes a deflector plate having its lower end pivotally mounted on one wall of said chute, an arm attached to said deflector plate, a solenoid attached to said arm, electric circuit means for energizing said solenoid, said electric circuit means being responsive to said photoelectric unit, and means for carrying away the diverted seeds from said chute.

References Cited in the file of this patent

UNITED STATES PATENTS

| | | |
|---|---|---|
| 2,131,095 | Cox | Sept. 27, 1938 |
| 2,351,702 | Peterson | June 20, 1944 |
| 2,501,403 | McKinsey | Mar. 21, 1950 |
| 2,504,731 | Rose et al. | Apr. 18, 1950 |
| 2,646,880 | Frankel | July 28, 1953 |
| 2,656,923 | Cox | Oct. 27, 1953 |
| 2,692,046 | Clary et al. | Oct. 19, 1954 |
| 2,696,297 | Matthews | Dec. 7, 1954 |

FOREIGN PATENTS

| | | |
|---|---|---|
| 294,575 | Great Britain | Sept. 19, 1928 |
| 312,684 | Great Britain | Jan. 23, 1930 |